United States Patent
Wolfner et al.

(10) Patent No.: US 11,943,812 B2
(45) Date of Patent: Mar. 26, 2024

(54) DETERMINING RANDOM ACCESS CHANNEL (RACH) RESOURCES OR PARAMETERS BASED ON NETWORK SLICE-BASED RESOURCE ALLOCATION CLASSES (RACS)

(71) Applicant: NOKIA TECHNOLOGIES OY, Espoo (FI)

(72) Inventors: György Tamás Wolfner, Budapest (HU); Malgorzata Tomala, Wroclaw (PL); Samuli Heikki Turtinen, Ii (FI); Philippe Godin, Versailles (FR); Alessio Casati, Surrey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 135 days.

(21) Appl. No.: 17/219,673

(22) Filed: Mar. 31, 2021

(65) Prior Publication Data
US 2022/0322444 A1 Oct. 6, 2022

(51) Int. Cl.
*H04W 74/08* (2009.01)
*H04W 68/00* (2009.01)
*H04W 72/53* (2023.01)

(52) U.S. Cl.
CPC ..... *H04W 74/0833* (2013.01); *H04W 68/005* (2013.01); *H04W 72/53* (2023.01)

(58) Field of Classification Search
None
See application file for complete search history.

(56) References Cited

U.S. PATENT DOCUMENTS

| | | | | |
|---|---|---|---|---|
| 2017/0174406 A1* | 6/2017 | Rehberg | ............. | B65D 73/0021 |
| 2018/0199263 A1* | 7/2018 | Huang-Fu | ......... | H04W 28/0289 |
| 2019/0174392 A1* | 6/2019 | Chun | .................... | H04W 48/08 |
| 2019/0174536 A1* | 6/2019 | Han | .................. | H04W 74/0833 |
| 2019/0327663 A1* | 10/2019 | Wirth | .................... | H04W 48/02 |

(Continued)

FOREIGN PATENT DOCUMENTS

| | | | | |
|---|---|---|---|---|
| GB | 2587489 A * | 3/2021 | .......... | H04W 68/005 |
| WO | WO-2020112606 A1 * | 6/2020 | ............ | H04W 48/02 |

(Continued)

OTHER PUBLICATIONS

CMCC, Verizon, "Study on enhancement of RAN Slicing," 3GPP Draft; RP-193254, 3GPP TSG-RAN meeting #86, Sitges, Barcelona, Dec. 9-12, 2019.

(Continued)

*Primary Examiner* — Jamaal Henson
(74) *Attorney, Agent, or Firm* — SQUIRE PATTON BOGGS (US) LLP

(57) ABSTRACT

Systems, methods, apparatuses, and computer program products for determining random access channel (RACH) resources or parameters based on network slice-based resource allocation classes (RACs) may be provided. A mapping between network slices and a set of RACs may be determined by a core network (CN). The CN may send this mapping to the UE. The UE may select RACH resources or parameters for a network slice. The radio access network (RAN) may determine a mapping between the RACs and the RACH resources or parameters. The UE may determine the corresponding RACH resources or parameters to be used for a RAC.

22 Claims, 7 Drawing Sheets

(56) References Cited

U.S. PATENT DOCUMENTS

| | | | | |
|---|---|---|---|---|
| 2019/0364492 A1* | 11/2019 | Azizi | .................... | H04W 24/08 |
| 2021/0127351 A1* | 4/2021 | Stojanovski | .......... | H04W 48/16 |

FOREIGN PATENT DOCUMENTS

| | | | | |
|---|---|---|---|---|
| WO | WO-2020137238 A1 * | 7/2020 | .......... | H04W 60/005 |
| WO | WO-2021239899 A1 * | 12/2021 | .......... | H04W 74/006 |
| WO | WO-2022000506 A1 * | 1/2022 | ........ | H04W 74/0833 |

OTHER PUBLICATIONS

3GPP TS 23.501 V16.8.0 (Mar. 2021), Technical Specification, 3rd Generation Partnership Project; Technical Specification Group Services and System Aspects; System architecture for the 5G System (5GS); Stage 2 (Release 16), Mar. 30, 2021.

3GPP TS 23.501 V17.0.0 (Mar. 2021), Technical Specification, 3rd Generation Partnership Project; Technical Specification Group Services and System Aspects; System architecture for the 5G System (5GS); Stage 2 (Release 17), Mar. 30, 2021.

3GPP TS 38.413 V15.10.0 (Jan. 2021), Technical Specification, 3rd Generation Partnership Project; Technical Specification Group Radio Access Network; NG-RAN; NG Application Protocol (NGAP) (Release 15), Jan. 4, 2021.

3GPP TS 38.413 V16.4.0 (Jan. 2021), Technical Specification, 3rd Generation Partnership Project; Technical Specification Group Radio Access Network; NG-RAN; NG Application Protocol (NGAP) (Release 16), Jan. 4, 2021.

3GPP TS 38.331 V16.4.1 (Mar. 2021), Technical Specification, 3rd Generation Partnership Project; Technical Specification Group Radio Access Network; NR; Radio Resource Control (RRC) protocol specification (Release 16), Mar. 30, 2021.

3GPP TS 38.331 V15.13.0 (Mar. 2021), Technical Specification, 3rd Generation Partnership Project; Technical Specification Group Radio Access Network; NR; Radio Resource Control (RRC) protocol specification (Release 15), Mar. 29, 2021.

3GPP TS 24.501 V17.1.0 (Dec. 2020), Technical Specification, 3rd Generation Partnership Project; Technical Specification Group Core Network and Terminals; Non-Access-Stratum (NAS) protocol for 5G System (5GS); Stage 3; (Release 17), Dec. 18, 2020.

3GPP TS 24.501 V16.7.0 (Dec. 2020), Technical Specification, 3rd Generation Partnership Project; Technical Specification Group Core Network and Terminals; Non-Access-Stratum (NAS) protocol for 5G System (5GS); Stage 3; (Release 16), Dec. 18, 2020.

3GPP TS 24.501 V15.6.0 (Dec. 2019), Technical Specification, 3rd Generation Partnership Project; Technical Specification Group Core Network and Terminals; Non-Access-Stratum (NAS) protocol for 5G System (5GS); Stage 3; (Release 15), Dec. 20, 2019.

Search Report dated Aug. 4, 2022, corresponding to European Patent Application No. 22162111.3.

Nokia et al: "RACH prioritisation for slices", 3GPP Draft; R2-2100599, 3rd Generation Partnership Project (3GPP), Mobile Competence Centre; 650, Route Des Lucioles; F-06921 Sophia-Antipolis Cedex; France, vol. RAN WG2, No. Electronic; Jan. 15, 2021.

Extended European Search Report dated Nov. 7, 2022, corresponding to European Patent Application No. 22162111.3.

* cited by examiner

DETERMINING RANDOM ACCESS CHANNEL (RACH) RESOURCES OR PARAMETERS BASED ON NETWORK SLICE-BASED RESOURCE ALLOCATION CLASSES (RACS)

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for determining random access channel (RACH) resources or parameters based on network slice-based resource allocation classes (RACs).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, an apparatus may include at least one processor and at least one memory including computer program code. The at least one memory and the computer program code may be configured to, with the at least one processor, cause the apparatus to receive signaling including mapping information that includes a mapping between one or more resource allocation classes and one or more random access channel resources or parameters. The at least one memory and the computer program code may be configured to, with the at least one processor, cause the apparatus to receive signaling including network slice mapping information that includes a mapping between the one or more resource allocation classes and one or more network slices. If a radio resource control request is to be transmitted, the at least one memory and the computer program code may be configured to, with the at least one processor, cause the apparatus to transmit signaling. The signaling may be transmitted either using, for a mobile terminated call, random access channel resources or parameters corresponding, based on the received mapping information, to a resource allocation class, or using, for a mobile originated call, random access channel resources or parameters corresponding, based on the mapping information, to the resource allocation class corresponding, based on the network slice mapping information, to a requested network slice associated with the mobile originated call. For the mobile terminated call, the resource allocation class may be received in a radio paging message initiating the mobile terminated call.

In a variant, the at least one memory and the computer program code may be configured to, with the at least one processor, further cause the apparatus, when receiving the signaling including the mapping information, to receive the signaling from a radio access network node. In a variant, the signaling may include system information broadcast in a cell associated with the radio access network node. In a variant, the at least one memory and the computer program code may be configured to, with the at least one processor, further cause the apparatus, when receiving the signaling including the network slice mapping information, to receive the signaling from a core network node. In a variant, the signaling may include a non-access stratum message. In a variant, the at least one memory and the computer program code may be configured to, with the at least one processor, further cause the apparatus, when receiving the signaling including the network slice mapping information, to receive the network slice mapping information from a radio access network node in a radio resource control message.

In a variant, the at least one memory and the computer program code may be configured to, with the at least one processor, further cause the apparatus, when using, for the mobile terminated call or the mobile originated call, the random access channel resources or parameters, to use, for the mobile terminated call or the mobile originated call, the random access channel resources or parameters corresponding to the resource allocation class. In a variant, the resource allocation class may include an operator-defined unified access class. In a variant, the at least one memory and the computer program code may be configured to, with the at least one processor, further cause the apparatus, when using, for the mobile terminated call, the random access channel resources or parameters, to use, for the mobile terminated call, the random access channel resources or parameters corresponding to the resource allocation class. In a variant, the resource allocation class included in the radio paging message may be encoded using a dedicated user equipment identity earlier allocated to the user equipment by a core network node or a radio access network node.

According to a second embodiment, an apparatus may include at least one processor and at least one memory including computer program code. The at least one memory and the computer program code may be configured to, with the at least one processor, cause the apparatus to determine mapping information that includes a mapping between one or more resource allocation classes and one or more random access channel resources or parameters. The at least one memory and the computer program code may be configured to, with the at least one processor, cause the apparatus to transmit signaling including the mapping information. The at least one memory and the computer program code may be configured to, with the at least one processor, cause the apparatus to transmit a paging radio signaling message. The paging radio signaling message is transmitted either: including, for a mobile terminated call where the paging radio signaling message is triggered by receiving a paging message, a resource allocation class received in the triggering paging message, or including, for a mobile terminated call where the paging radio signaling message is triggered by incoming data for an inactive user equipment, a resource allocation class corresponding to a protocol data unit session resource associated with the incoming data.

In a variant, the at least one memory and the computer program code may be configured to, with the at least one processor, further cause the apparatus, when transmitting the signaling including the mapping information, to transmit, in a cell associated with the apparatus, the signaling including the mapping information. In a variant, the signaling may further include system information. In a variant, the at least one memory and the computer program code may be configured to, with the at least one processor, further cause the apparatus, when transmitting the paging radio signaling message, to transmit the paging radio signaling message including the resource allocation class. In a variant, the resource allocation class may correspond to a protocol data unit session resource and may be received when the protocol data unit session resource is setup or modified in at least one of: a protocol data unit session resource setup request message, a protocol data unit session resource modify request message, an initial context setup request message, or a handover request message. In a variant, the at least one memory and the computer program code may be configured to, with the at least one processor, further cause the apparatus, when transmitting the paging radio signaling message, to transmit the paging radio signaling message including the resource allocation class corresponding to the protocol data unit session resource. In a variant, the resource allocation class may be determined using the network slice associated with the protocol data unit session resource and a data structure that includes network slice mapping information including a mapping between one or more network slices and the one or more resource allocation classes.

In a variant, the at least one memory and the computer program code may be configured to, with the at least one processor, further cause the apparatus to transmit, to a core network node, an indication of whether the apparatus supports the one or more resource allocation classes. In a variant, the at least one memory and the computer program code may be configured to, with the at least one processor, further cause the apparatus to transmit, to the core network node in association with transmitting the indication, network slice mapping information that includes a mapping between the one or more resource allocation classes and one or more network slices, or receive, from the core network node in association with transmitting the indication, network slice mapping information that includes a mapping between the one or more resource allocation classes and one or more network slices. In a variant, the at least one memory and the computer program code may be configured to, with the at least one processor, further cause the apparatus, when transmitting the paging radio signaling message, to transmit the paging radio signaling message where the resource allocation class may be encoded using a dedicated user equipment paging identity earlier allocated to the user equipment.

According to a third embodiment, an apparatus may include at least one processor, and at least one memory including computer program code. The at least one memory and the computer program code may be configured to, with the at least one processor, cause the apparatus to determine network slice mapping information that includes a mapping between one or more resource allocation classes and one or more network slices. The at least one memory and the computer program code may be configured to, with the at least one processor, cause the apparatus to transmit, to a user equipment, signaling including the network slice mapping information. The at least one memory and the computer program code may be configured to, with the at least one processor, cause the apparatus to, if a paging message is transmitted towards the user equipment, for a mobile terminated call associated with a network slice, include, in the paging message, a resource allocation class corresponding to the network slice based on the network slice mapping information.

In a variant, the at least one memory and the computer program code may be configured to, with the at least one processor, further cause the apparatus, when transmitting the signaling including the network slice mapping information, to transmit the signaling where the signaling may further include a non-access stratum signaling message. In a variant, the at least one memory and the computer program code may be configured to, with the at least one processor, further cause the apparatus to receive the network slice mapping information from a radio access network node in a non-user equipment-associated message. In a variant, the at least one memory and the computer program code may be configured to, with the at least one processor, further cause the apparatus at least to transmit, to a radio access network node, a next generation application protocol message associated with setting up or modifying a protocol data unit session resource. In a variant, the next generation application protocol message may include the resource allocation class.

In a variant, the at least one memory and the computer program code may be configured to, with the at least one processor, further cause the apparatus, when transmitting the next generation application protocol message, to transmit the next generation application protocol message where the resource allocation class included in the next generation application protocol message may correspond to the network slice associated with the protocol data unit session resource based on the network slice mapping information. In a variant, the at least one memory and the computer program code may be configured to, with the at least one processor, further cause the apparatus, when transmitting the paging message including the resource allocation class, to transmit the paging message including the resource allocation class based on receiving, in a non-user equipment-associated message, an indication that a radio access network node supports the resource allocation class. In a variant, the at least one memory and the computer program code may be configured to, with the at least one processor, further cause the apparatus, when transmitting the network slice mapping information, to, for the mobile terminated call, allocate different user equipment identities based on the resource allocation class to be used.

According to a fourth embodiment, a method may include receiving signaling including mapping information that includes a mapping between one or more resource allocation classes and one or more random access channel resources or parameters. The method may include receiving signaling including network slice mapping information that includes a mapping between the one or more resource allocation classes and one or more network slices. The method may include, if a radio resource control request is to be transmitted, transmitting signaling. The signaling may be transmitted using, for a mobile terminated call, random access channel resources or parameters corresponding, based on the received mapping information, to a resource allocation class, or using, for a mobile originated call, random access channel resources or parameters corresponding, based on the mapping information, to the resource allocation class corresponding, based on the network slice mapping information, to a requested network slice associated with the mobile originated call. In a variant, for the mobile terminated call, the resource allocation class may be received in a radio paging message initiating the mobile terminated call.

In a variant, receiving the signaling including the mapping information may include receiving the signaling from a radio access network node. In a variant, the signaling may include system information broadcast in a cell associated with the radio access network node. In a variant, receiving the signaling including the network slice mapping information may include receiving the signaling from a core network node. In a variant, the signaling may include a non-access stratum message. In a variant, receiving the signaling including the network slice mapping information may include receiving the network slice mapping information from a radio access network node in a radio resource control message.

In a variant, using, for the mobile terminated call or the mobile originated call, the random access channel resources or parameters may include using, for the mobile terminated call or the mobile originated call, the random access channel resources or parameters corresponding to the resource allocation class. In a variant, the resource allocation class may include an operator-defined unified access class. In a variant, using, for the mobile terminated call, the random access channel resources or parameters may include using, for the mobile terminated call, the random access channel resources or parameters corresponding to the resource allocation class. In a variant, the resource allocation class included in the radio paging message may be encoded using a dedicated user equipment identity earlier allocated to the user equipment by a core network node or a radio access network node.

According to a fifth embodiment, a method may include determining mapping information that includes a mapping between one or more resource allocation classes and one or more random access channel resources or parameters. The method may include transmitting signaling including the mapping information. The method may include transmitting a paging radio signaling message either: including, for a mobile terminated call where the paging radio signaling message is triggered by receiving a paging message, a resource allocation class received in the triggering paging message, or including, for a mobile terminated call where the paging radio signaling message is triggered by incoming data for an inactive user equipment, a resource allocation class corresponding to a protocol data unit session resource associated with the incoming data.

In a variant, transmitting the signaling including the mapping information may include transmitting, in a cell associated with the apparatus, the signaling including the mapping information. In a variant, the signaling may further include system information. In a variant, transmitting the paging radio signaling message including the resource allocation class corresponding to the protocol data unit session resource may include transmitting the paging radio signaling message including the resource allocation class. In a variant, the resource allocation class may correspond to a protocol data unit session resource and may be received when the protocol data unit session resource is setup or modified in at least one of: a protocol data unit session resource setup request message, a protocol data unit session resource modify request message, an initial context setup request message, or a handover request message. In a variant, transmitting the paging radio signaling message including the resource allocation class may include transmitting the paging radio signaling message including the resource allocation class corresponding to the protocol data unit session resource where the resource allocation class is determined using the network slice associated with the protocol data unit session resource and a data structure that includes network slice mapping information including a mapping between one or more network slices and the one or more resource allocation classes.

In a variant, the method may include transmitting, to a core network node, an indication of whether the apparatus supports the one or more resource allocation classes. In a variant, the method may include transmitting, to the core network node in association with transmitting the indication, network slice mapping information that includes a mapping between the one or more resource allocation classes and one or more network slices, or receive, from the core network node in association with transmitting the indication, network slice mapping information that includes a mapping between the one or more resource allocation classes and one or more network slices. In a variant, transmitting the paging radio signaling message may include transmitting the paging radio signaling message. In a variant, the resource allocation class may be encoded using a dedicated user equipment paging identity earlier allocated to the user equipment.

According to a sixth embodiment, a method may include determining network slice mapping information that includes a mapping between one or more resource allocation classes and one or more network slices. The method may include transmitting, to a user equipment, signaling including the network slice mapping information. The method may include, if a paging message is transmitted towards the user equipment, for a mobile terminated call associated with a network slice, including, in the paging message, a resource allocation class corresponding to the network slice based on the network slice mapping information.

In a variant, transmitting the signaling including the network slice mapping information may include transmitting the signaling where the signaling further includes a non-access stratum signaling message. In a variant, the method may include receiving the network slice mapping information from a radio access network node in a non-user equipment-associated message. In a variant, the method may include transmitting, to a radio access network node, a next generation application protocol message associated with setting up or modifying a protocol data unit session resource, wherein the next generation application protocol message includes the resource allocation class.

In a variant, transmitting the next generation application protocol message may include transmitting the next generation application protocol message where the resource allocation class included in the next generation application protocol message corresponds to the network slice associated with the protocol data unit session resource based on the network slice mapping information. In a variant, transmitting the paging message including the resource allocation class may include transmitting the paging message including the resource allocation class based on receiving, in a non-user equipment-associated message, an indication that a radio access network node supports the resource allocation class. In a variant, transmitting the network slice mapping information may include, for the mobile terminated call, allocating different user equipment identities based on the resource allocation class to be used.

A seventh embodiment may be directed to an apparatus that may include circuitry configured to cause the apparatus to perform the method according to the fourth embodiment, the fifth embodiment, or the sixth embodiment, or any of the variants of those embodiments discussed above.

An eighth embodiment may be directed to an apparatus that may include means for performing the method according to the fourth embodiment, the fifth embodiment, or the sixth embodiment, or any of the variants of those embodiments discussed above. Examples of the means may include one or more processors, memory, and/or computer program codes for causing the performance of the operation.

A ninth embodiment may be directed to a computer readable medium comprising program instructions stored thereon for causing an apparatus to perform at least the method according to the fourth embodiment, the fifth embodiment, or the sixth embodiment, or any of the variants of those embodiments discussed above.

A tenth embodiment may be directed to a computer program product encoding instructions for causing an apparatus to perform at least the method according to the fourth embodiment, the fifth embodiment, or the sixth embodiment, or any of the variants of those embodiments discussed above.

BRIEF DESCRIPTION OF THE DRAWINGS

For proper understanding of example embodiments, reference should be made to the accompanying drawings, wherein.

DETAILED DESCRIPTION

Figure 1:
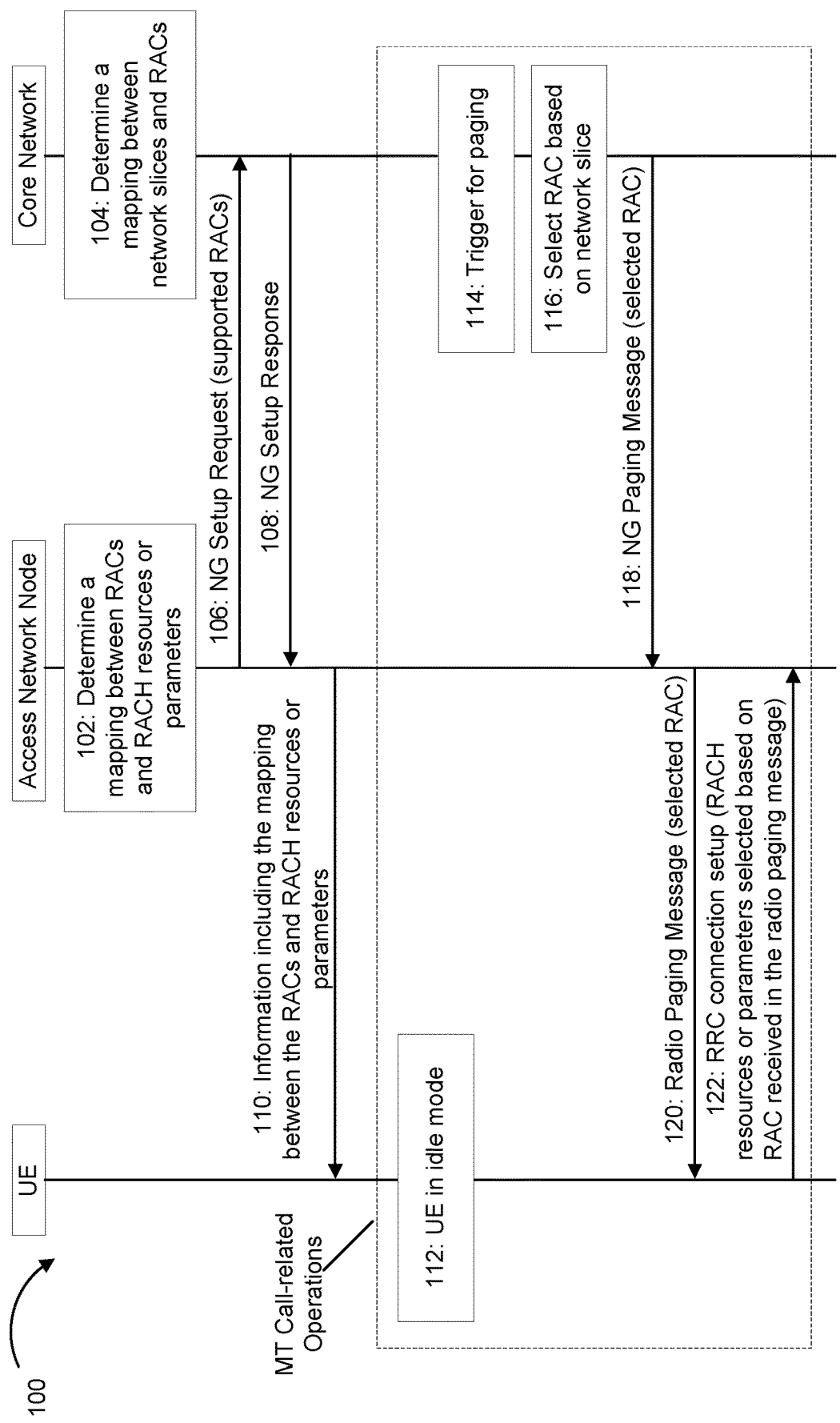
FIG. 1 illustrates an example signal diagram for determining RACH resources or parameters for a mobile terminated (MT) call based on network slice-based resource allocation classes (RACs), according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for determining RACH resources or parameters based on network slice-based RACs is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

NR may support network slicing and may enable a UE fast access to a cell supporting an intended network slice. A network slice-based RACH configuration may be applied to an idle or an inactive UE. Additionally, or alternatively, the association between network slices and/or network slice-specific RACH resources may be configured and provided to the UE in a system information block (SIB) or dedicated signaling. However, a single UE may use multiple network slices and a paging message may be network slice agnostic. When there is paging due to MT data, the UE may have to be able to determine the network slice or network slice group that triggered the paging to be able to use a network slice or network slice group-specific RACH configuration to establish a radio resource control (RRC) connection. After paging message reception, the UE may trigger initial access and a RACH procedure, but may not be able to determine which network slice-specific resources to use, since there may not be a way for the UE to determine the network slice or network slice group. As can be understood, there may be a need for a UE to determine resources to use for a network slice.

Some embodiments described herein may provide for determining RACH resources or parameters based on network slice-based RACs. Certain embodiments may perform a two-stage mapping between network slices and specific RACH configurations, such as RACH resources or parameters. A mapping between network slices and a set of RACs may be determined by a core network (CN) based on stored information stored in a network node, such as in an access and mobility management function (AMF). Mapping between RACs and RACH resources or parameters may be determined by a radio access network (RAN) (e.g., on a local basis, such as on a per gNB or cell basis). The CN may determine the mapping between the network slices (e.g., single network slice selection assistance information (S-NSSAI)) and a set of RACs. The CN may send this mapping to the UE, e.g., via the non-access stratum (NAS) in a register accept message during a registration procedure. In this way, the UE may select RACH resources or parameters for the network slice that is associated with RRC connection establishment.

In certain embodiments, the RAN may determine the mapping between the RACs and the RACH resources or parameters (e.g., on a local basis). Different RACH resources or parameters may be used for different localities and/or a different number of resource or parameter sets may be available for the different localities. The number of RACs may be higher than the number of RACH resource or parameter sets that are available in cell. The available RACH resource or parameter sets and their numbers may be different in different cells (e.g., a macro cell may have totally different parameters than a micro cell). This type of cell-specific RAN parameters may normally be hidden from the CN. Each gNB cell may broadcast the mapping between the RACH resources or parameters to be used and the RACs.

Each gNB may also indicate, via the NG interface in a setup request message, whether it supports RACs or not. In some embodiments, this information may be included by the RAN in a setup message and may be further updated by update messages (the RAN may be provisioned with the RACs and RACH pools and may also be provisioned with the S-NSSAIs per RAC, and the RAN may provide this latter information to the CN when the NG interface is established).

For MT calls when the UE is idle, the CN may send a paging message including the relevant RAC based on a network slice. The gNB may include the RAC in a radio paging message. The UE may determine, from the cell broadcast, the corresponding RACH resources or parameters to be used. In a variant for MT calls, the CN may allocate different UE identities depending on the RAC to be used. The CN may send the mapping between the UE identity and the RAC to the UE, e.g., in a NAS register accept message. When paging, the CN may include the relevant UE identity in the paging message, and the gNB may use that UE identity to page the UE over the air interface. The UE may determine, from the NAS register accept message, which RAC corresponds to that UE identity and, from the cell broadcast, which corresponding RACH resources or parameters are to be used.

For MT calls when the UE is in an RRC inactive state, the CN may indicate the RAC associated with a protocol data unit (PDU) session resource in, e.g., a PDU session resource setup message, according to the network slice with which the PDU session is associated. This information may be stored by the gNB. Whenever a paging trigger (e.g., downlink data) arrives at the gNB associated with a PDU session resource, the gNB may include the earlier received RAC into the radio paging message. The UE may then determine, from the cell broadcast, the corresponding RACH resources or parameters to be used.

In a variant for MT calls, the gNB may allocate different inactive radio network temporary identifiers (I-RNTIs) to the UE, depending on RACs to be used. The gNB may send the mapping between I-RNTIs and RACs to the UE in, e.g., an RRC release message, such as when sending the UE to an RRC inactive mode. When the gNB determines to page the UE for a RAC, it may include the mapped I-RNTI in the radio paging message towards the UE. The UE may determine, from the previous RRC release information, which RAC corresponds to that I-RNTI, and then may determine, from the cell broadcast, which corresponding RACH resources or parameters are to be used.

In a variant, for MT calls, the CN may provide the gNB, e.g., in the NG setup response message, a mapping between network slices (e.g., S-NSSAI) and RACs. When a PDU session resource setup is received by the gNB, the gNB may determine, from the included S-NSSAI, an associated RAC.

For MO calls, when the UE performs a MO call for a particular network slice, the UE may determine the corresponding RAC from the mapping information received in a NAS register accept message. The UE may then determine, from the cell broadcast, which corresponding RACH resources or parameters are to be used. In a variant for MO calls, unified access classes (UAC) may be used rather than RACs, e.g., the mapping between network slices and operator-defined unified access classes may be provided to the UE in a NAS register accept message, and the cell may broadcast the mapping between unified access classes and RACH resources or parameters to be used.

FIG. 1 illustrates an example signal diagram 100 for determining RACH resources or parameters for a MT call based on network slice-based RACs, according to some embodiments. As illustrated in FIG. 1, the signal diagram 100 may include a UE, an access network node (e.g., a gNB), and a core network (e.g., a 5G core (5GC)) that includes one or more network nodes.

As illustrated at 102, the access network node may determine a mapping between RACs and RACH resources or parameters (e.g., mapping information). For example, the access network node may determine which RACH resources or parameters are associated with certain RACs. As illustrated at 104, the core network may determine a mapping between network slices and RACs (network slice mapping information). For example, the core network may determine which network slices are associated with certain RACs.

As illustrated at 106, the access network node may transmit, and the core network may receive, an NG setup request message. The setup request message may include information that identifies RACs that are supported by the access network node or information that the access network node supports operation with RACs. As illustrated at 108, the core network may transmit, and the access network node may receive, an NG setup response. As illustrated at 110, the access network node may transmit, and the UE may receive, information (e.g., system information) that includes the mapping between the RACs and the RACH resources or parameters determined by the access network node.

As illustrated in FIG. 1, operations 112, 114, 116, 118, 120, and 122 may include MT call-related operations. As illustrated at 112, the UE may be operating in idle mode. As illustrated at 114, the core network may detect a trigger for paging the UE for a certain network slice. As illustrated at 116, the core network may select a RAC based on this network slice (e.g., using the mapping determined at 104). For example, the core network may determine a network slice to be used by the UE, and may determine a RAC associated with the network slice. As illustrated at 118, the core network may transmit, and the access network node may receive, an NG paging message. The NG paging may include the selected RAC. As illustrated at 120, the access network node may transmit, and the UE may receive, a radio paging message that includes the selected RAC.

As illustrated at 122, the UE may transmit, and the access network node may receive, signaling for starting an RRC connection setup. The signaling may use RACH resources or parameters selected based on the RAC received in the radio paging message. For example, the UE may determine the RAC from the radio paging message signaling and, using the mapping received at 110, may determine the RACH resources or parameters associated with the RAC.

As described above, FIG. 1 is provided as an example. Other examples are possible, according to some embodiments.

Figure 2:
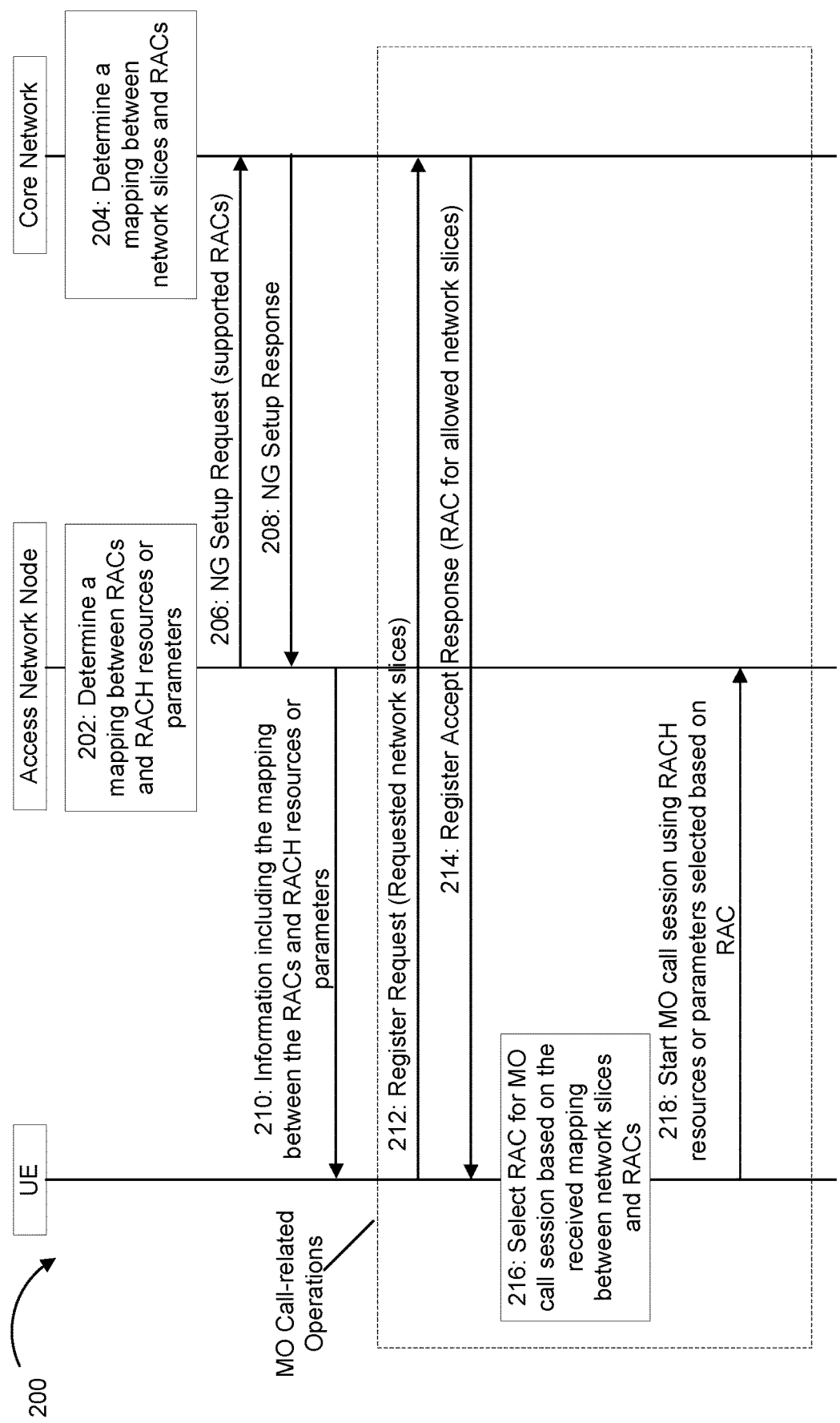
FIG. 2 illustrates an example signal diagram for determining RACH resources or parameters for a mobile originated (MO) call based on network slice-based RACs, according to some embodiments.

FIG. 2 illustrates an example signal diagram 200 for determining RACH resources or parameters for a MO call based on network slice-based RACs, according to some embodiments. As illustrated in FIG. 2, the signal diagram 200 includes a UE, an access network node, and a core network.

Operations 202, 204, 206, 208, and 210 may be similar to operations 102, 104, 106, 108, and 110, respectively, illustrated in FIG. 1. As illustrated in FIG. 2, operations 212, 214, 216, and 218 may include MO call-related operations. As illustrated at 212, the UE may transmit, and the core network may receive, a register request. The register request may include one or more requested network slices. As illustrated at 214, the core network may transmit, and the UE may receive, a register accept response. The register accept response may include a RAC for one or more allowed network slices (e.g., the requested network slices that the core network may allow, e.g., based on subscription information stored in the core network). For example, the register accept response may include a mapping between RACs and allowed network slices. As illustrated at 216, the UE may select a RAC for an MO call session based on the received mapping between network slices and RACs. For example, the UE may determine to trigger an MO call associated with one of the previously received allowed network slices, and may then determine a RAC to use based on the mapping between RACs and network slices. The UE may additionally select RACH resources or parameters based on the selected RAC. For example, the UE may use the mapping received at 210 to determine which RACH resources or parameters to use based on the RAC selected at 216. As illustrated at 218, the UE may transmit, and the access network node may receive, signaling to start an MO call session using the RACH resources or parameters selected based on the RAC.

As indicated above, FIG. 2 is provided as an example. Other examples are possible, according to some embodiments.

Figure 3:
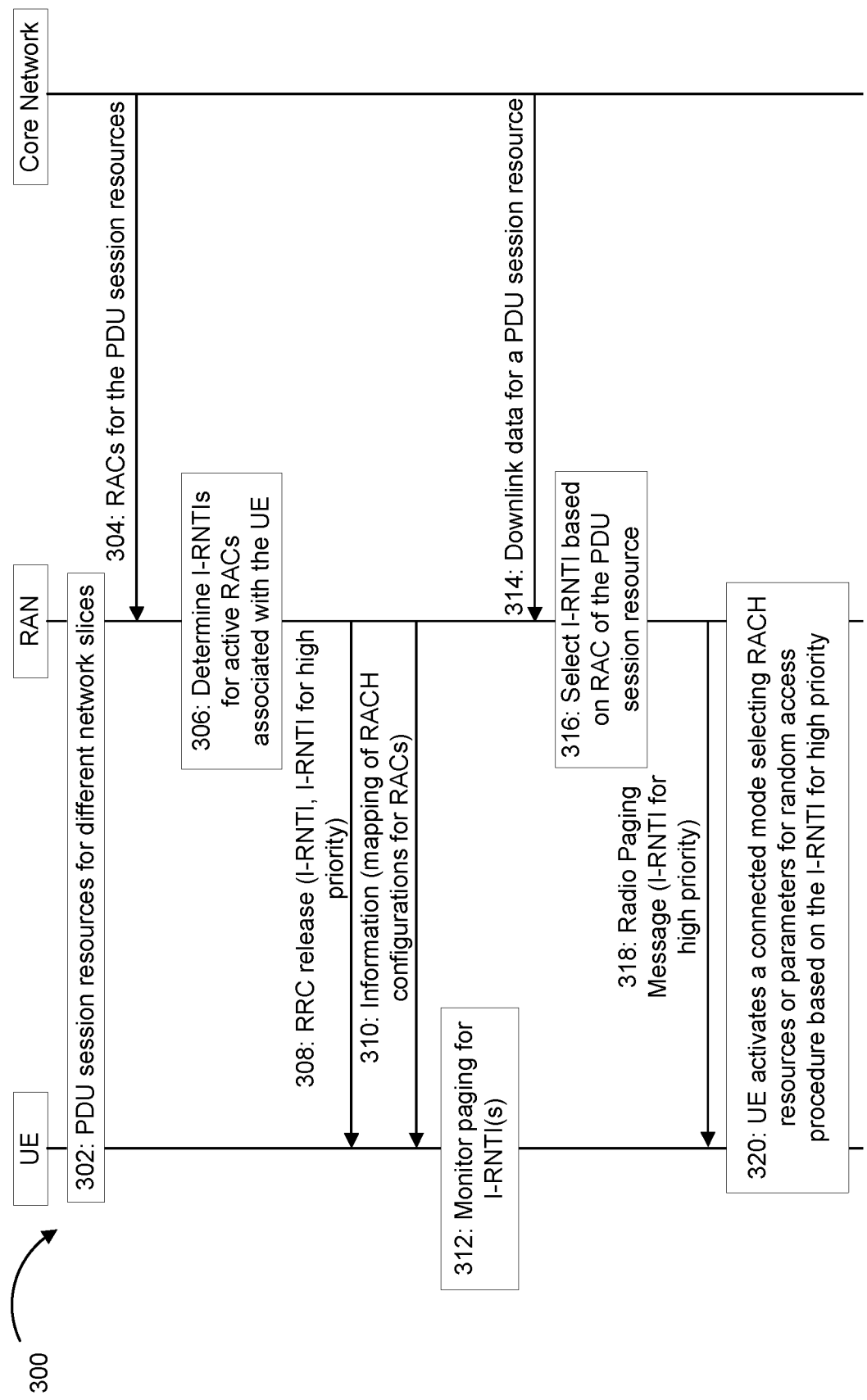
FIG. 3 illustrates an example signal diagram for determining RACH resources or parameters for a MT call based on network slice-based RACs, according to some embodiments.

FIG. 3 illustrates an example signal diagram 300 for determining RACH resources or parameters for a MT call based on network slice-based RACs, according to some embodiments. For example, FIG. 3 illustrates an example where a RAN may assign and use multiple, e.g., I-RNTIs to indicate the RAC in paging. As illustrated in FIG. 3, the example signal diagram 300 includes a UE, a radio access network (RAN), and a core network.

As illustrated at 302, the UE and the RAN may establish PDU session resources for different network slices. As illustrated at 304, the core network may transmit, and the RAN may receive, RACs for the PDU session resources. For example, the core network may provide information related to the active PDU session resources and the RACs associated with those PDU session resources. As illustrated at 306, the RAN may determine I-RNTIs for active RACs associated with the UE. As illustrated at 308, the RAN may transmit, and the UE may receive, an RRC release message to cause the UE to operate in an RRC inactive state. The RRC release message may include a suspend configuration for the RRC connection, I-RNTIs, e.g., for non-high priority scenarios, I-RNTIs for high priority scenarios, and mapping information between RACs and these I-RNTI(s). For example, certain embodiments may use two RACs as two different priorities for call setup, e.g., voice calls or emergency calls may be prioritized as high priority scenarios. As illustrated at 310, the RAN may transmit, and the UE may receive, information (e.g., system information). The information may include a mapping of RACH configuration for various RACs associated with the UE.

As illustrated at 312, the UE may monitor paging for I-RNTIs received from the RAN at 308. As illustrated at 314, the core network may transmit, and the RAN may receive, downlink data for a PDU session resource. As illustrated at 316, the RAN may select an I-RNTI based on the RAC of the PDU session resource associated with the downlink data. For example, the RAN may select an appropriate I-RNTI for the UE based on the trigger received from the core network. In the example illustrated in FIG. 3, assume that the RAN selects a I-RNTI for high priority. As illustrated at 318, the RAN may transmit, and the UE may receive, radio paging message signaling. For example, the RAN may include the I-RNTI for high priority scenarios in the radio paging message signaling based on having selected the I-RNTI for high priority scenarios. As illustrated at 320, the UE may activate a connected mode selecting RACH resources or parameters for a random access procedure based on the I-RNTI for high priority but still using the (different) I-RNTI as a UE identifier. For example, the UE may trigger an RRC resume procedure, and then the UE may select the RACH resources or parameters based on the high priority I-RNTI received in the radio paging message signaling. The UE may use a default I-RNTI or a short I-RNTI during the random access procedure to identify itself, in some embodiments.

As described above, FIG. 3 is provided as an example. Other examples are possible, according to some embodiments.

As described elsewhere herein, certain embodiments may utilize a suspend configuration (e.g., a SuspendConfig message). The SuspendConfig message may include information for full I-RNTI values for various RACs. For example, the sequence of additional I-RNTIs may have a size from 1 to, e.g., 8 values. The information for the additional I-RNTIs may include full I-RNTI values, and an ra-Class sequence with a size from 1 to the 8 values.

Certain example embodiments may provide detailed information related to RACs. For example, certain embodiments may provide a mapping RAC for the network slice configured in the UE at registration time, but then a particular PDU session resource in the network slice may have a PDU session-specific RAC based on a rule stored at the session management function (SMF). The PDU session-specific RAC may be sent to the UE in a PDU session establishment accept message. The usage of such RACH may follow the same approach as for a network slice-specific RAC.

Figure 4:
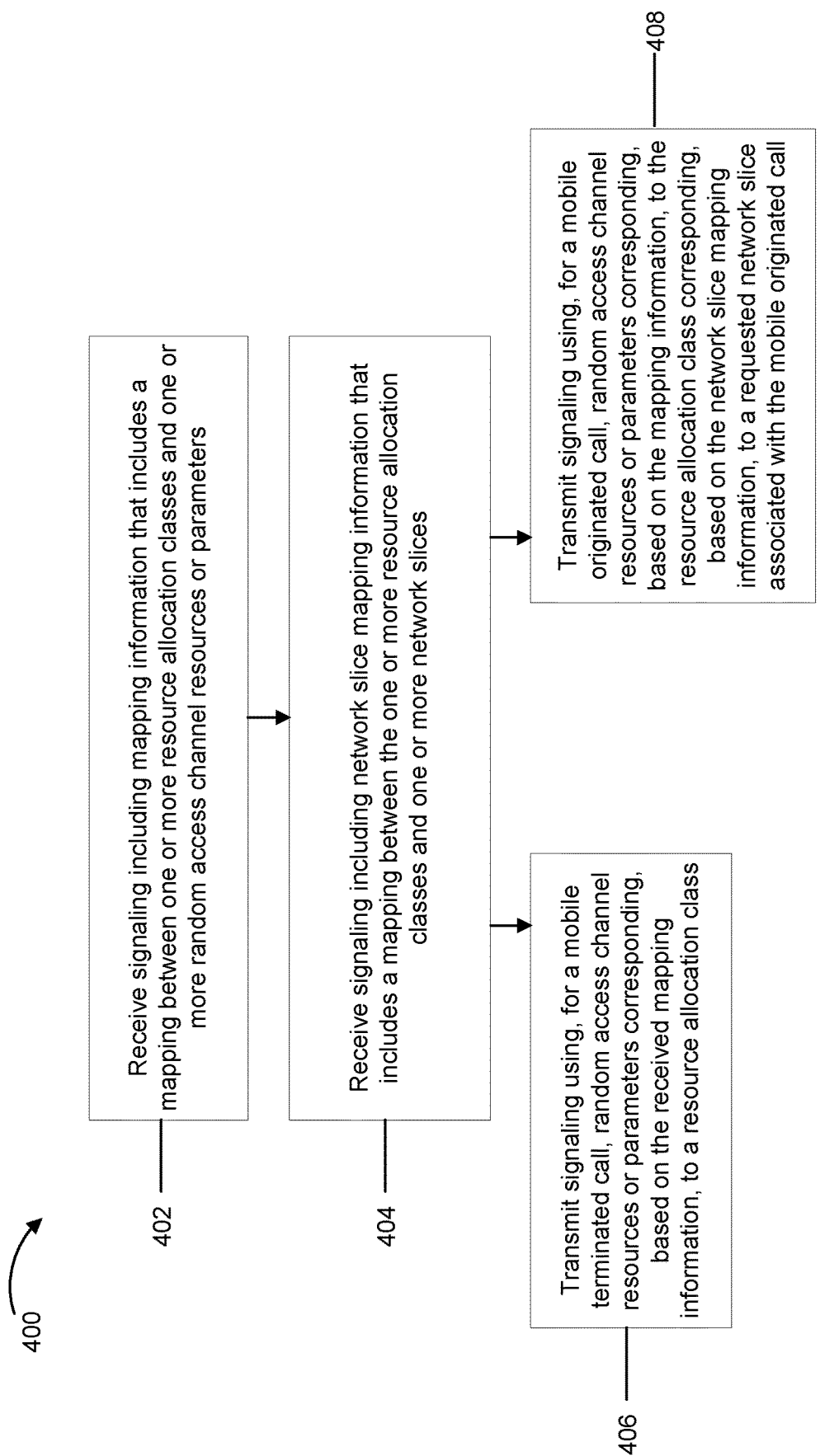
FIG. 4 illustrates an example flow diagram of a method, according to some embodiments.

FIG. 4 illustrates an example flow diagram of a method 400, according to some embodiments. For example, FIG. 4 may illustrate example operations of a UE (e.g., apparatus 20 illustrated in, and described with respect to, FIG. 4b). Some of the operations illustrated in FIG. 4 may be similar to some operations shown in, and described with respect to, FIGS. 1-3.

In an embodiment, the method 400 may include, at 402, receiving signaling including mapping information that includes a mapping between one or more resource allocation classes and one or more random access channel resources or parameters, e.g., in a manner similar to that at 110 of FIG. 1 and/or 210 of FIG. 2. The signaling at 402 may be received from a RAN node. The method 400 may include, at 404, receiving signaling including network slice mapping information that includes a mapping between the one or more resource allocation classes and one or more network slices (e.g., one or more S-NSSAIs). The signaling at 404 may be received from a core network node. If a radio resource control request is to be transmitted, the method 400 may include, at 406, transmitting signaling using, for a mobile terminated call, random access channel resources or parameters corresponding, based on the received mapping information, to a resource allocation class. In some embodiments, for the mobile terminated call, the resource allocation class may have been received in a radio paging message initiating the mobile terminated call. If a radio resource control request is to be transmitted, the method may include, at 408, transmitting signaling using, for a mobile originated call, random access channel resources or parameters corresponding, based on the mapping information, to the resource allocation class corresponding, based on the network slice mapping information, to a requested network slice associated with the mobile originated call. In some embodiments, the radio resource control request may include at least one of a radio resource control setup request or a radio resource control resume request.

The method 400 illustrated in FIG. 4 may include one or more additional aspects described below or elsewhere herein. In some embodiments, the receiving at 402 may include receiving the signaling from a radio access network node. In some embodiments, the signaling may include system information broadcast in a cell associated with the radio access network node. In some embodiments, the receiving at 404 may include receiving the signaling from a core network node, where the signaling may include a non-access stratum message. In some embodiments, the non-access stratum message may include a non-access stratum register accept message received during a registration procedure.

In some embodiments, the receiving at 404 may include receiving the network slice mapping information from a radio access network node. In some embodiments, the receiving at 404 may include receiving the network slice mapping information from the radio access network node in a radio resource control (RRC) message. I In some embodiments, the receiving at 404 may include receiving the network slice mapping information from the radio access network node in a radio resource control (RRC) message releasing the UE to RRC idle mode or RRC inactive mode. In some embodiments, for the mobile originated call or the mobile terminated call, the resource allocation class may include an operator-defined unified access class. In some embodiments, for the mobile terminated call, the resource allocation class included in the radio paging message may be encoded using a dedicated user equipment identity earlier allocated to the user equipment by a core network node or a radio access network node.

As described above, FIG. 4 is provided as an example. Other examples are possible according to some embodiments.

Figure 5:
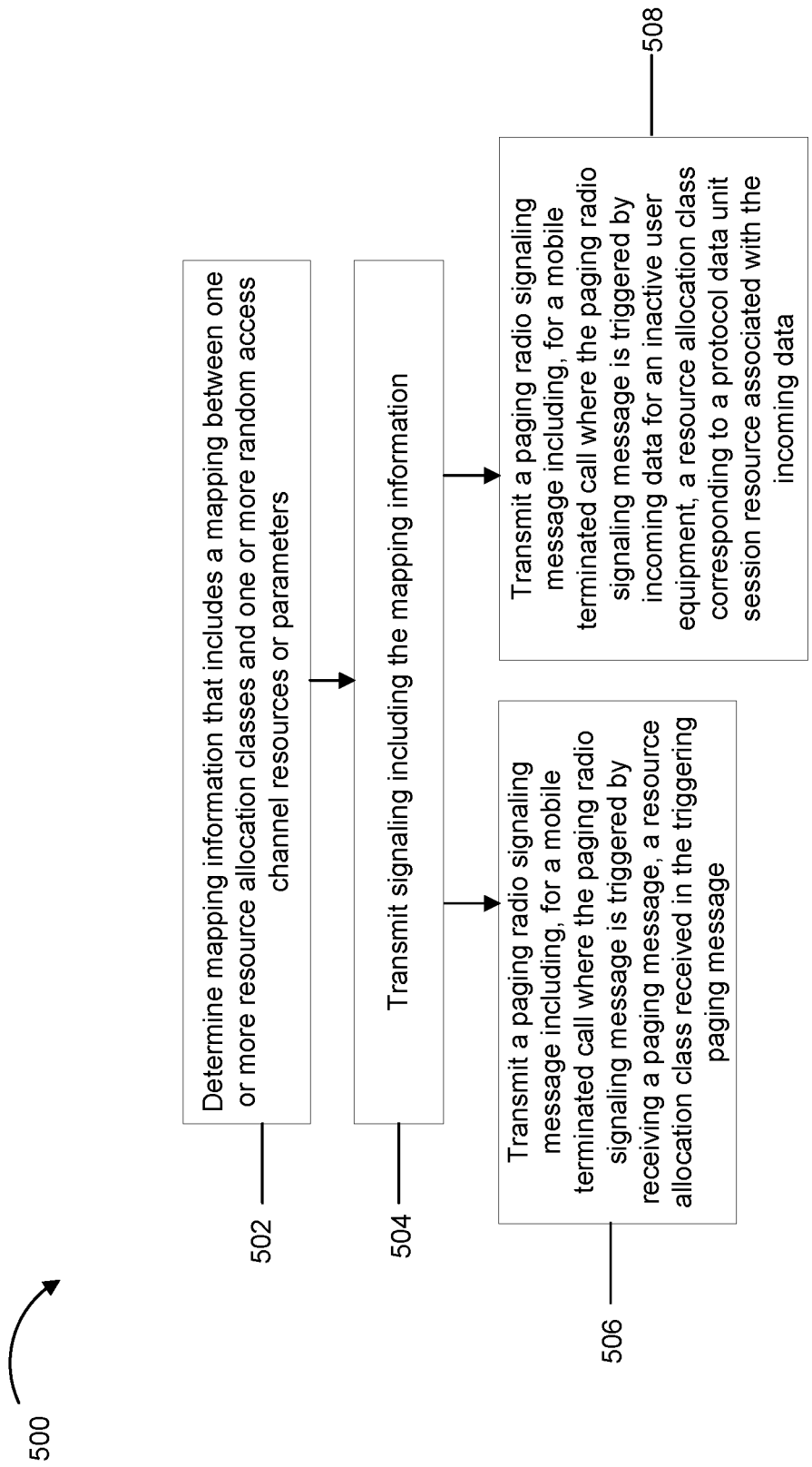
FIG. 5 illustrates an example flow diagram of a method, according to some embodiments.

FIG. 5 illustrates an example flow diagram of a method 500, according to some embodiments. For example, FIG. 5 may illustrate example operations of a network node (e.g., apparatus 10 illustrated in, and described with respect to, FIG. 4a). Specifically, FIG. 5 may illustrate example operations of a gNB. Some of the operations illustrated in FIG. 5 may be similar to some operations shown in, and described with respect to, FIGS. 1-3.

In an embodiment, the method 500 may include, at 502, determining mapping information that includes a mapping between one or more resource allocation classes and one or more random access channel resources or parameters, e.g., in a manner similar to that at 102 of FIG. 1 and/or 202 of FIG. 2. The method 500 may include, at 504, transmitting signaling including the mapping information, e.g., in a manner similar to that at 110 of FIG. 1 and/or 210 of FIG. 2. The method 500 may include, at 506, transmitting a paging radio signaling message including, for a mobile terminated call where the paging radio signaling message is triggered by receiving a paging message (e.g., an NG paging message), a resource allocation class received in the triggering paging message, e.g., in a manner similar to that at 120 of FIG. 1. The method 500 may include, at 508, transmitting a paging radio signaling message including, for a mobile terminated call where the paging radio signaling message is triggered by incoming data for an inactive user equipment (e.g., an RRC inactive user equipment), a resource allocation class corresponding to a protocol data unit session resource associated with the incoming data.

The method illustrated in FIG. 5 may include one or more additional aspects described below or elsewhere herein. In some embodiments, for the including for the mobile terminated call where the paging radio signaling message is triggered by receiving the paging message, the resource allocation class may be determined from a network slice (S-NSSAI) received in the triggering paging message based on a data structure that includes a mapping between resource allocation classes and network slices (S-NSSAIs). In some embodiments, the transmitting at 504 may include transmitting, in a cell associated with the apparatus, the signaling including the mapping information. In some embodiments, the signaling may include system information. In some embodiments, for the transmitting at 508, the resource allocation class may correspond to a protocol data unit session resource and is received when the protocol data unit session resource is setup or modified in at least one of: a protocol data unit session resource setup request message (e.g., an NG PDU session resource setup request message), a protocol data unit session resource modify request message, an initial context setup request message, or a handover request message.

In some embodiments, for the transmitting at 508, the resource allocation class may be determined using the network slice (e.g., S-NSSAI) associated with the protocol data unit session resource and a data structure that includes network slice mapping information including a mapping between one or more network slices (e.g., S-NSSAIs) and the one or more resource allocation classes. In some embodiments, the method 500 may further include transmitting, to a core network node, an indication of whether the apparatus supports the one or more resource allocation classes. In some embodiments, the method 500 may further include transmitting, to the core network node in association with transmitting the indication, network slice mapping information that includes a mapping between the one or more resource allocation classes and one or more network slices. In some embodiments, the method 500 may further include receiving, from the core network node in association with transmitting the indication, network slice mapping information that includes a mapping between the one or more resource allocation classes and one or more network slices. In some embodiments, the method 500 may further include transmitting, to the user equipment, network slice mapping information that includes a mapping between the one or more resource allocation classes and one or more network slices. In some embodiments, the transmitting the network slice mapping information may include transmitting the network slice mapping information to the user equipment using a radio resource control (RRC) message. In some embodiments, the transmitting the network slice mapping information may include transmitting the network slice mapping information to the user equipment using a radio resource control (RRC) release message. In some embodiments, the resource allocation class may be encoded using a dedicated user equipment paging identity earlier allocated to the user equipment. In some embodiments, the resource allocation class may include an operator-defined unified access class.

As described above, FIG. 5 is provided as an example. Other examples are possible according to some embodiments.

Figure 6:
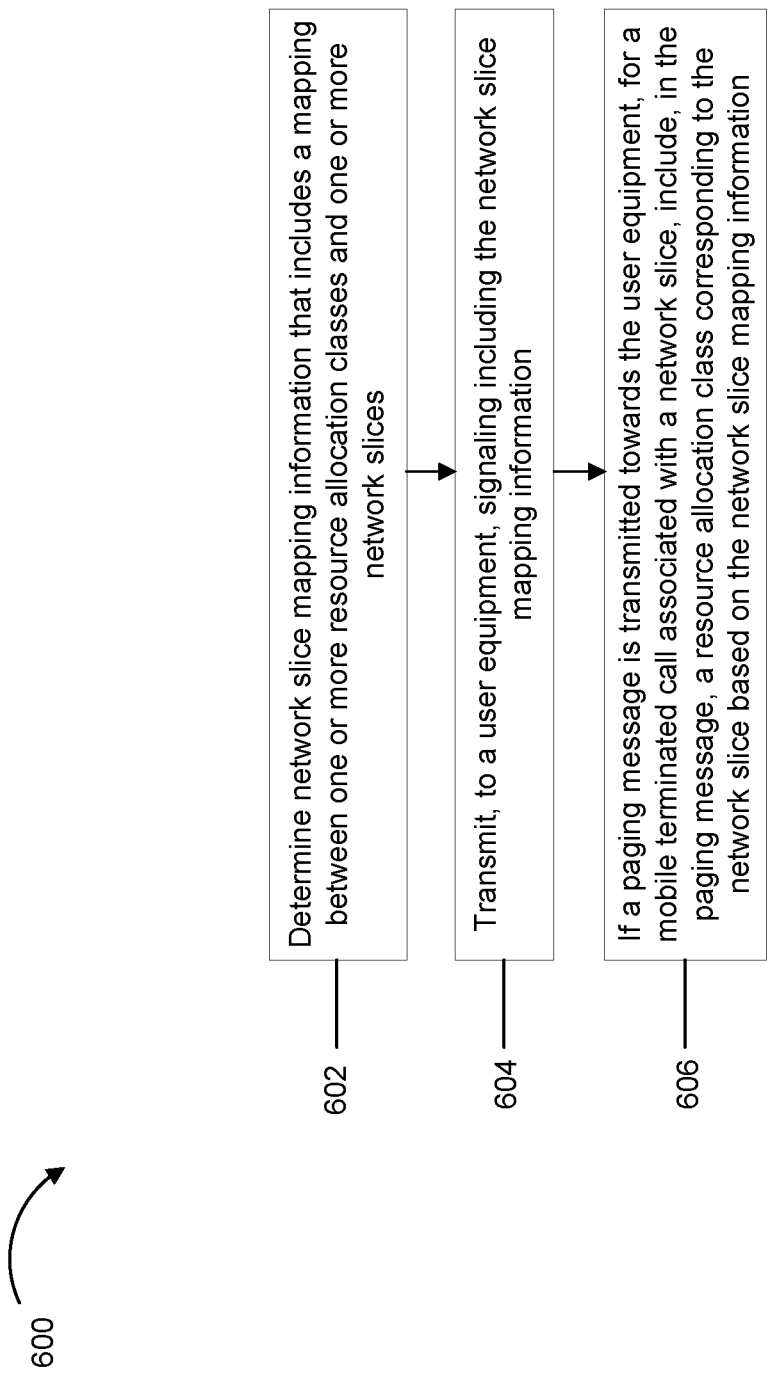
FIG. 6 illustrates an example flow diagram of a method, according to some embodiments.

FIG. 6 illustrates an example flow diagram of a method 600, according to some embodiments. For example, FIG. 6 may illustrate example operations of a network node (e.g., apparatus 10 illustrated in, and described with respect to, FIG. 4a). Specifically, FIG. 6 may illustrate example operations of a core network node (e.g., a 5G core network node (5GC)). Some of the operations illustrated in FIG. 6 may be similar to some operations shown in, and described with respect to, FIGS. 1-3.

In an embodiment, the method 600 may include, at 602, determining network slice mapping information that includes a mapping between one or more resource allocation classes and one or more network slices (e.g., S-NSSAIs), e.g., in a manner similar to that at 104 of FIG. 1 and/or 204 of FIG. 2. The method 600 may include, at 604, transmitting, to a user equipment, signaling including the network slice mapping information. The method 600 may include, at 606, if a paging message (e.g., an NG paging message) is transmitted towards the user equipment, for a mobile terminated call associated with a network slice (S-NSSAI), including, in the paging message, a resource allocation class corresponding to the network slice based on the network slice mapping information. In some embodiments, the received paging message may include information identifying the network slice (e.g., S-NSSAI), and the access network node may determine a resource allocation class from the received information based on a data structure that maps the S-NSSAI to the resource allocation class.

The method illustrated in FIG. 6 may include one or more additional aspects described below or elsewhere herein. In some embodiments, the signaling transmitted at 604 may include a non-access stratum signaling message. In some embodiments, the method 600 may include receiving the network slice mapping information from a radio access network node in a non-user equipment-associated message. In some embodiments, the method 600 may include transmitting, to a radio access network node, a next generation application protocol message associated with setting up or modifying a protocol data unit session resource. In some embodiments, the next generation application protocol message may include the resource allocation class. In some embodiments, when transmitting the next generation application protocol message, the resource allocation class included in the next generation application protocol message may correspond to the network slice associated with the protocol data unit session resource based on the network slice mapping information.

In some embodiments, the method 600 may include transmitting the paging message including the resource allocation class based on receiving, in a non-user equipment-associated message, an indication that a radio access network node supports the resource allocation class. In some embodiments, the method 600 may include, for the mobile terminated call, allocating different user equipment identities based on the resource allocation class to be used. In some embodiments, the resource allocation class may include an operator-defined unified access class.

As described above, FIG. 6 is provided as an example. Other examples are possible according to some embodiments.

Figure 7B:
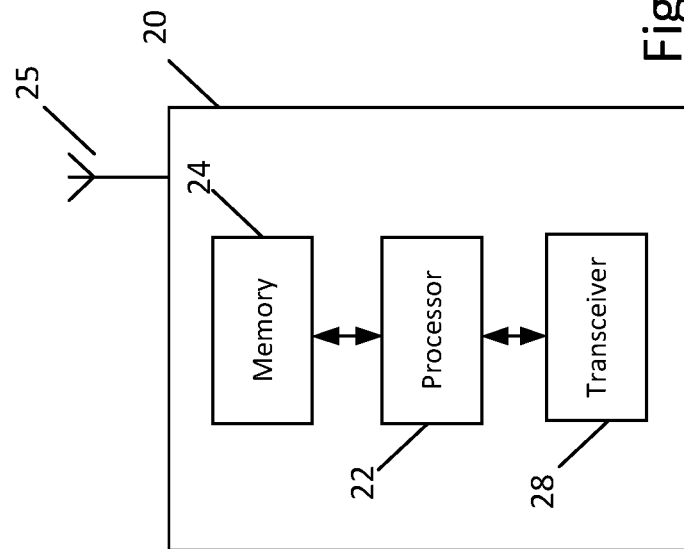
FIG. 7b illustrates an example block diagram of an apparatus, according to another embodiment.
Figure 7A:
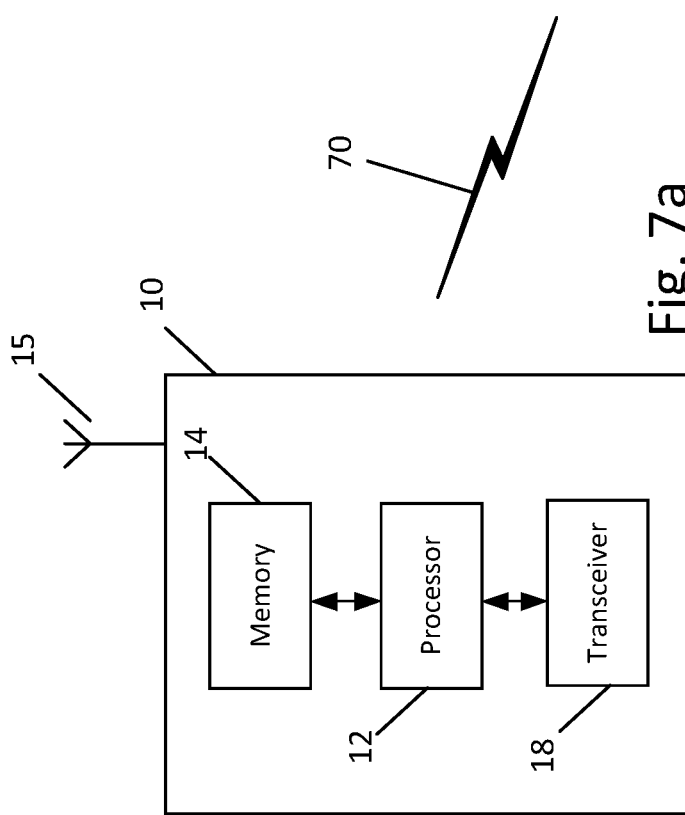
FIG. 7a illustrates an example block diagram of an apparatus, according to an embodiment.

FIG. 7a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-3, 5, and 6. For instance, apparatus 10 may be controlled by memory 14 and processor 12 to perform the methods of FIGS. 5 and 6.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-4. For instance, in one embodiment, apparatus 20 may be controlled by memory 24 and processor 22 to perform the method of FIG. 4.

In some embodiments, an apparatus (e.g., apparatus 10 and/or apparatus 20) may include means for performing a method or any of the variants discussed herein, e.g., a method described with reference to FIGS. 4-6. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is reduction or elimination of device operating issues that may occur as a result of a UE being unaware of which network slice paged the UE, thereby reducing or eliminating consumption of network and/or computing resources that would otherwise occur as a result of such operating issues. Accordingly, the use of some example embodiments results in improved functioning of communications networks and their nodes and, therefore constitute an improvement at least to the technological field of mobile terminated or mobile originated calls, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

I-RNTI Inactive Radio Network Temporary Identifier
MO Mobile Originated
MT Mobile Terminated
PDU Protocol Data Unit
RAC Resource Allocation Class
RAN Radio Access Network

We claim:

1. An apparatus, comprising:
at least one processor; and
at least one memory including computer program code,
wherein the at least one memory and the computer program code are configured to, with the at least one processor, cause the apparatus at least to:
receive signaling comprising mapping information that comprises a mapping between one or more resource allocation classes and one or more random access channel resources or parameters;
receive signaling comprising network slice mapping information that comprises a mapping between the one or more resource allocation classes and one or more network slices; and
transmit a radio resource control request, either:
using, for a mobile terminated call, random access channel resources or parameters corresponding, based on the received mapping information, to a resource allocation class, wherein the resource allocation class was received in a radio paging message initiating the mobile terminated call, or
using, for a mobile originated call, random access channel resources or parameters corresponding, based on the mapping information, to a resource allocation class corresponding, based on the network slice mapping information, to a requested network slice associated with the mobile originated call.

2. The apparatus according to claim 1, wherein the at least one memory and the computer program code are configured to, with the at least one processor, further cause the apparatus, when receiving the signaling comprising the mapping information, at least to:
receive the signaling from a radio access network node, wherein the signaling comprises system information broadcast in a cell associated with the radio access network node.

3. The apparatus according to claim 1, wherein the at least one memory and the computer program code are configured to, with the at least one processor, further cause the apparatus, when receiving the signaling comprising the network slice mapping information, at least to:
receive the signaling from a core network node, wherein the signaling comprises a non-access stratum message.

4. The apparatus according to claim 1, wherein the at least one memory and the computer program code are configured to, with the at least one processor, further cause the apparatus, when receiving the signaling comprising the network slice mapping information, at least to:
receive the network slice mapping information from a radio access network node in a radio resource control message.

5. The apparatus according to claim 1, wherein the at least one memory and the computer program code are configured to, with the at least one processor, further cause the apparatus, when using, for the mobile terminated call or the mobile originated call, the random access channel resources or parameters corresponding to the resource allocation class, at least to:
use, for the mobile terminated call or the mobile originated call, the random access channel resources or parameters corresponding to the resource allocation class, wherein the resource allocation class comprises an operator-defined unified access class.

6. The apparatus according to claim 1, wherein the at least one memory and the computer program code are configured to, with the at least one processor, further cause the apparatus, when using, for the mobile terminated call, the random access channel resources or parameters corresponding to the resource allocation class, at least to:
use, for the mobile terminated call, the random access channel resources or parameters corresponding to the resource allocation class, wherein the resource allocation class included in the radio paging message is encoded using a dedicated user equipment identity earlier allocated to the user equipment by a core network node or a radio access network node.

7. The apparatus according to claim 1, wherein the at least one memory and the computer program code are configured to, with the at least one processor, further cause the apparatus, when receiving the signaling comprising the mapping information, at least to:
receive, from the radio access network node, a radio resource control message comprising mapping information between one or more resource allocation classes and one or more radio network temporary identifiers,
wherein the resource allocation class was received in a radio paging message comprises receiving a radio network temporary identifier mapped to the resource allocation class.

8. An apparatus, comprising:
at least one processor; and
at least one memory including computer program code,
wherein the at least one memory and the computer program code are configured to, with the at least one processor, cause the apparatus at least to:
determine network slice mapping information that includes a mapping between one or more resource allocation classes and one or more network slices; and
transmit, to a user equipment, signaling comprising the network slice mapping information; and
page the user equipment, for a mobile terminated call associated with a network slice, using a resource allocation class corresponding to the network slice based on the network slice mapping information.

9. The apparatus according to claim 8, wherein the at least one memory and the computer program code are configured to, with the at least one processor, further cause the apparatus, when transmitting the signaling comprising the network slice mapping information, at least to:
transmit the signaling, wherein the signaling further comprises a non-access stratum signaling message.

10. The apparatus according to claim 8, wherein the at least one memory and the computer program code are configured to, with the at least one processor, further cause the apparatus at least to:
receive the network slice mapping information from a radio access network node in a non-user equipment-associated message.

11. The apparatus according to claim 8, wherein the at least one memory and the computer program code are configured to, with the at least one processor, further cause the apparatus at least to:
transmit, to a radio access network node, a next generation application protocol message associated with setting up or modifying a protocol data unit session resource, wherein the next generation application protocol message comprises the resource allocation class.

12. The apparatus according to claim 11, wherein the at least one memory and the computer program code are configured to, with the at least one processor, further cause the apparatus, when transmitting the next generation application protocol message, at least to:
transmit the next generation application protocol message, wherein the resource allocation class included in the next generation application protocol message corresponds to the network slice associated with the protocol data unit session resource based on the network slice mapping information.

13. The apparatus according to claim 8, wherein the at least one memory and the computer program code are configured to, with the at least one processor, further cause the apparatus, when transmitting the paging message including the resource allocation class, at least to:
transmit the paging message including the resource allocation class based on receiving, in a non-user equipment-associated message, an indication that a radio access network node supports the resource allocation class.

14. The apparatus according to claim 8, wherein the at least one memory and the computer program code are configured to, with the at least one processor, further cause the apparatus, when transmitting the network slice mapping information, at least to:
for the mobile terminated call, allocate different user equipment identities based on the resource allocation class to be used.

15. An apparatus, comprising:
at least one processor; and
at least one memory including computer program code,
wherein the at least one memory and the computer program code are configured to, with the at least one processor, cause the apparatus at least to:
transmit signaling comprising mapping information that comprises a mapping between one or more resource allocation classes and one or more random access channel resources or parameters;
forward signaling comprising network slice mapping information that comprises a mapping between the one or more resource allocation classes and one or more network slices; and
receive a radio resource control request, either:
for a mobile terminated call, random access channel resources or parameters corresponding, based on the mapping information, to a resource allocation class, wherein the resource allocation class was carried in a radio paging message initiating the mobile terminated call, or
for a mobile originated call, random access channel resources or parameters corresponding, based on the mapping information, to a resource allocation class corresponding, based on the network slice mapping information, to a requested network slice associated with the mobile originated call.

16. The apparatus according to claim 15, wherein the at least one memory and the computer program code are configured to, with the at least one processor, further cause the apparatus at least to: transmit a radio paging message either:
including, for a mobile terminated call where the radio paging message is triggered by receiving a paging message, a resource allocation class received in the triggering paging message, or including, for a mobile terminated call where the radio paging message is triggered by incoming data for an inactive user equipment, a resource allocation class corresponding to a protocol data unit session resource associated with the incoming data.

17. The apparatus according to claim 16, wherein the at least one memory and the computer program code are configured to, with the at least one processor, further cause the apparatus, when transmitting the radio paging message including the resource allocation class corresponding to the protocol data unit session resource, at least to:
transmit the radio paging message including the resource allocation class, wherein the resource allocation class corresponds to a protocol data unit session resource and is received when the protocol data unit session resource is setup or modified in at least one of: a protocol data unit session resource setup request message, a protocol data unit session resource modify request message, an initial context setup request message, or a handover request message.

18. The apparatus according to claim 16, wherein the at least one memory and the computer program code are configured to, with the at least one processor, further cause the apparatus, when transmitting the radio paging message including the resource allocation class corresponding to the protocol data unit session resource, at least to:

transmit the radio paging message including the resource allocation class corresponding to the protocol data unit session resource, wherein the resource allocation class is determined using the network slice associated with the protocol data unit session resource and a data structure that includes network slice mapping information comprising a mapping between one or more network slices and the one or more resource allocation classes.

19. The apparatus according to claim 15, wherein the at least one memory and the computer program code are configured to, with the at least one processor, further cause the apparatus, when transmitting the signaling comprising the mapping information, at least to:

transmit, in a cell associated with the apparatus, the signaling comprising the mapping information, wherein the signaling further comprises system information.

20. The apparatus according to claim 15, wherein the at least one memory and the computer program code are configured to, with the at least one processor, further cause the apparatus at least to:

transmit, to a core network node, an indication of whether the apparatus supports the one or more resource allocation classes.

21. The apparatus according to claim 20, wherein the at least one memory and the computer program code are configured to, with the at least one processor, further cause the apparatus at least to:

transmit, to the core network node in association with transmitting the indication, network slice mapping information that includes a mapping between the one or more resource allocation classes and one or more network slices, or receive, from the core network node in association with transmitting the indication, network slice mapping information that includes a mapping between the one or more resource allocation classes and one or more network slices.

22. The apparatus according to claim 15, wherein the at least one memory and the computer program code are configured to, with the at least one processor, further cause the apparatus, when transmitting the radio paging message, at least to:

transmit the radio paging message, wherein the resource allocation class is encoded using a dedicated user equipment paging identity earlier allocated to the user equipment.

* * * * *